US010564931B1

(12) United States Patent
Witek et al.

(10) Patent No.: US 10,564,931 B1
(45) Date of Patent: Feb. 18, 2020

(54) FLOATING-POINT ARITHMETIC OPERATION RANGE EXCEPTION OVERRIDE CIRCUIT

(71) Applicant: Apple Inc., Cupertino, CA (US)

(72) Inventors: Richard T. Witek, Redmond, WA (US);
Brian D. Clark, San Jose, CA (US);
Peter C. Eastty, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 5 days.

(21) Appl. No.: 15/946,428

(22) Filed: Apr. 5, 2018

(51) Int. Cl.
*G06F 7/499* (2006.01)
*G06F 7/483* (2006.01)
*G06F 9/30* (2018.01)

(52) U.S. Cl.
CPC ............ *G06F 7/483* (2013.01); *G06F 9/3001* (2013.01)

(58) Field of Classification Search
None
See application file for complete search history.

(56) References Cited

U.S. PATENT DOCUMENTS

| | | | | |
|---|---|---|---|---|
| 5,553,015 A * | 9/1996 | Elliott | ................. | G06F 7/483 708/205 |
| 6,151,669 A * | 11/2000 | Huck | .................. | G06F 9/30094 708/495 |
| 6,499,046 B1 * | 12/2002 | Nguyen | ............... | G06F 7/49921 708/530 |
| 7,962,729 B2 * | 6/2011 | Rivera | ....................... | G06F 9/38 708/498 |
| 2003/0169077 A1 * | 9/2003 | Dupont De Dinechin | ................... | G06F 7/509 326/104 |
| 2006/0149803 A1 | 7/2006 | Siu et al. | | |
| 2007/0005676 A1 * | 1/2007 | Henry | ................. | G06F 7/49921 708/552 |
| 2008/0288571 A1 | 11/2008 | Kamoshida | | |
| 2009/0198974 A1 * | 8/2009 | Barowski | ............ | G06F 7/49921 712/222 |
| 2012/0084533 A1 | 4/2012 | Sperber et al. | | |

(Continued)

OTHER PUBLICATIONS

Analog Devices, Inc., ADSP-21160 SHARC® DSP Instruction Set Reference, Revision 2.1, Apr. 2013, Part No. 82-001967-01, pp. 1, 6-1 (p. 151), 6-2 (152), 6-27 (177), and 6-51 (201).

(Continued)

*Primary Examiner* — David H Malzahn
(74) *Attorney, Agent, or Firm* — Kowert, Hood, Munyon, Rankin & Goetzel, P.C.

(57) ABSTRACT

In various embodiments, a floating-point arithmetic circuit includes a range exception detection circuit and an output circuit. The range exception detection circuit may generate a selection signal that indicates whether a floating-point arithmetic result generated within the floating-point arithmetic circuit is within a specified range. The output circuit may output the floating-point arithmetic result in response to the selection signal indicating the floating-point arithmetic result is within a specified range. The output circuit may output a corresponding specified value in response to the selection signal indicating the floating-point arithmetic result is not within the specified range. Accordingly, floating-point arithmetic operations may be performed in combination with an operation that limits a range of an output to a specified range.

17 Claims, 6 Drawing Sheets

(56) References Cited

U.S. PATENT DOCUMENTS

2014/0122555 A1 5/2014 Hickmann et al.
2018/0373500 A1* 12/2018 Gschwind .............. G06F 7/483

OTHER PUBLICATIONS

Hwa-Joon Oh, et al., "Fully Pipelined Single-Precision Floating-Point Unit in the Synergistic Processor Element of a CELL Processor," IEEE Journal of Solid-State Circuits, vol. 41, No. 4, Apr. 2006, p. 761.

Sung-Won Lee, et al."A 24-bit Floating-Point Audio DSP Controller Supporting Fast Exponentiation," Proceedings of the 2003 International Symposium on Circuits and Systems, May 25-28, 2003, pp. II-748-II-751.

Tom. M. Bruint Jes, et al., "Sabrewing: A Lightweight Architecture for Combined Floating-Point and Integer Arithmetic," ACM Transactions on Architecture and Code Optimization, vol. 8, No. 4, Article 41, Publication date: Jan. 2012 , pp. 41:3 and 41:4.

Datapath—Floating Point Overview, Synopsys, Inc., SolvNet DesignWare.com, DesignWare minPower Components, Mar. 2010, p. 2.

Cell Broadband Engine—Programming Tutorial, Version 2.1, IBM, Mar. 1, 2007, p. 64.

Sung-Won Lee, et al., "Low cost floating-point unit design for audio applications," IEEE International Symposium on Circuits and Systems, May 26-29, 2002, 4 pages.

ADSP-21065L SHARC Technical Reference, B Compute Operation Reference, 2018, pp. B-4 and B-49.

ADSP-21065L SHARC User's Manual, 2 Computation Units, 2018, pp. 2-12 and 2-25.

The Software Behind a Large Digital Mixer, AES, Presented at the 99th Convention, Oct. 6-9, 1995, p. 6.

Saturation arithmetic, https://en.wikipedia.org/wiki/Saturation_arithmetic, 3 pages. [Retrieved Mar. 29, 2018].

Representation of Numbers and Arithmetic in Signal Processor, Laboratory work 1, Digital Signal Processors, http://users.utcluj.ro/~elupu/Curs/upload/Laboratoare/DSP_Lab_eng/Lab1_Representation_of_Numbers_and_Arithmetic_in_Signal_Processors.pdf 14 pages. [Retrieved Mar. 29, 2018].

* cited by examiner

| Exception Condition | Specified Sign Output Value | Specified Exponent Output Value | Specified Mantissa Output Value |
|---|---|---|---|
| Overflow | Same as arithmetic result | Largest value in specified range | Largest value in specified range |
| Not A Number | Same as arithmetic result | Largest value in specified range | Largest value in specified range |
| Denormal | Positive | Most Negative Exponent | Zero |
| Negative Zero | Positive | Most Negative Exponent | Zero |

FIG. 3

FLOATING-POINT ARITHMETIC OPERATION RANGE EXCEPTION OVERRIDE CIRCUIT

BACKGROUND

Technical Field

This disclosure relates generally to a floating-point arithmetic operation range exception override circuit.

Description of the Related Art

Floating-point arithmetic devices may trigger an exception when results of computations differ from a desired the number format. When the exception is triggered, the device may substitute a bit pattern, such as a special restricted number or a value that is not a number, for the result. In some cases, such as media computations, values outside of a particular range (e.g., these exception values) may not correspond to valid outputs and thus may cause additional problems.

Further, saturation arithmetic is a popular version of arithmetic for fixed-point arithmetic devices, and may be used in floating-point arithmetic devices. However, when saturation arithmetic is used, overflow is converted to "infinity" or "negative infinity", and subsequent operations using this result will also produce a similar value. Accordingly, exceptions may, in some cases, be propagated between several results.

SUMMARY

In various embodiments, an arithmetic circuit is disclosed where a range exception detection circuit detects whether a floating-point arithmetic result generated within the arithmetic circuit corresponds to an overflow exception condition. In response to detecting an overflow exception condition, the range exception detection circuit may indicate, to an output circuit, that a specified value within a specified numerical range should be output. As a result, the arithmetic circuit may perform floating-point arithmetic operations and may be prevented from outputting values that are not within the specified numerical range.

In some cases, outputting values that are not within the specified numerical range may be undesirable. For example, in some applications (e.g., various real-time operations such as some audio processing applications), an output may be desired within a particular interval. In a system where an arithmetic circuit an output outside the specified numerical range is treated as a general purpose exception, generation of an output of a processor that includes the arithmetic circuit may be delayed. Further, to address the general purpose exception, the processor may consume an undesirable amount of energy. Accordingly, in some embodiments, a processor including a floating-point arithmetic operation range exception override circuit may generate an output more quickly and using less energy, as compared to a processor that does not include a floating-point arithmetic operation range exception override circuit.

BRIEF DESCRIPTION OF THE DRAWINGS

FIG. 3 is a table illustrating exemplary specified outputs for several exemplary potential exceptions.

Figure 1:
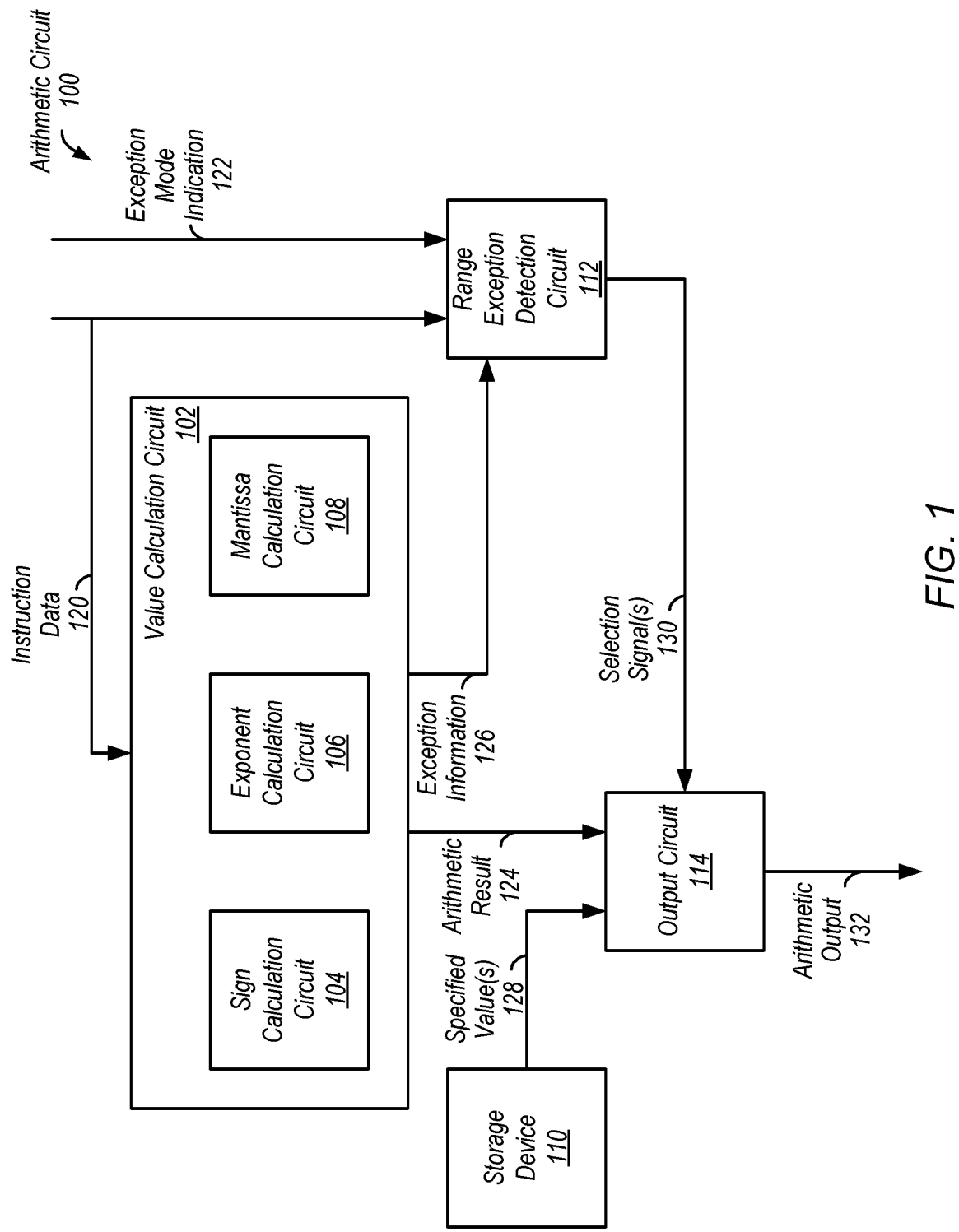
FIG. 1 is a block diagram illustrating one exemplary embodiment of a floating-point arithmetic operation range exception override circuit.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a processing circuit that includes three comparators, the terms "first comparator" and "second comparator" can be used to refer to any two of the three comparators, and not, for example, just logical comparators 0 and 1.

When used in the claims, the term "or" is used as an inclusive or and not as an exclusive or. For example, the phrase "at least one of x, y, or z" means any one of x, y, and z, as well as any combination thereof (e.g., x and y, but not z).

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION

A floating-point arithmetic operation range exception override circuit is disclosed herein where floating-point arithmetic results of an arithmetic circuit that are not within a specified numerical range (e.g., results indicating an exception condition or results that are larger or smaller than the specified numerical range) are replaced by specified values that are within the specified numerical range. Accordingly, in such cases, the arithmetic circuit may be prevented from outputting values that are not within the specified numerical range. As a result, in some cases, operations performed using the arithmetic results (e.g., operations following the IEEE STD 754-2008) may be performed without performing general purpose exception operations to modify the values. The arithmetic circuit may perform the floating-point arithmetic operation and may limit the result to the specified numerical range as part of a single operation in response to a single instruction (e.g., a floating-point instruction).

Turning now to FIG. 1, a simplified block diagram illustrating one embodiment of an arithmetic circuit 100 is shown. In the illustrated embodiment, arithmetic circuit 100 includes value calculation circuit 102, range exception detection circuit 112, storage device 110, and output circuit 114. In the illustrated embodiment, value calculation circuit 102 includes sign calculation circuit 104, exponent calculation circuit 106, and mantissa calculation circuit 108. In some embodiments, arithmetic circuit 100 may be or may be a portion of an arithmetic logic unit (ALU). Although various circuits are illustrated as being separate, in various embodiments, various circuits or portions of circuits may be combined. For example, various comparators of range exception detection circuit 112 may be used to calculate various values by value calculation circuit 102. As another example, in some embodiments, storage device 110 may be included in range exception detection circuit 112 or in output circuit 114. Further, in some embodiments, additional circuits or fewer circuits may be included. As further discussed below with reference to FIG. 5, in some embodiments, arithmetic circuit 100 may be included in another processing circuit, such as an audio processing circuit. In some embodiments, arithmetic circuit 100 may be configured to override overflow exception conditions corresponding to arithmetic results outside of a specified range, where the range is smaller than a range of values that can be represented by arithmetic circuit 100. In other words, as used herein, "exception" and/or "exception conditions" may refer to arithmetic results that are outside of a specified range that is smaller than a range of values that can normally be represented. In other embodiments, as further described below with reference to FIGS. 2 and 3, arithmetic circuit 100 may be configured to override overflow exception conditions and other types of exception conditions such as denormal exception conditions and sign exception conditions.

Value calculation circuit 102 may receive instruction data 120, requesting a floating-point arithmetic operation. For example, instruction data 120 may request a floating-point multiply operation between a first operand and a second operand. In response to instruction data 120, value calculation circuit 102 may perform various logical operations to generate arithmetic result 124 and exception information 126. Arithmetic result 124 may indicate at least one of a sign, an exponent, or a mantissa resulting from the arithmetic operation requested by instruction data 120. Exception information 126 may indicate the presence of one or more exception conditions. In some embodiments, exception information 126 may include some or all of arithmetic result 124. In some embodiments, instruction data 120 may only include a subset of an arithmetic instruction. For example, instruction data 120 may include operands and an indication of an operation to be performed by value calculation circuit 102, where the operation is a subset of an instruction indicated by a corresponding opcode. In some embodiments, instruction data 120 may indicate a type of the operation, such as an audio processing operation (e.g., the instruction may be an audio processing instruction).

As further discussed below with reference to FIG. 2, range exception detection circuit 112 may detect whether arithmetic result 124 corresponds to various exception conditions. Range exception detection circuit 112 may receive at least one of instruction data 120, exception mode indication 122, or exception information 126. Range exception detection circuit 112 may determine whether arithmetic circuit is in an exception override mode based on exception mode indication 122. Exception mode indication 122 may be received as part of instruction data 120 (e.g., instruction data 120 may have an opcode that indicates the exception override mode), or may be received from a storage location associated with arithmetic circuit 100, such as a particular location within storage device 110. In some embodiments, arithmetic circuit 100 may not include exception mode indication 122 (e.g., because arithmetic circuit 100 is always configured to operate in the exception mode). In some embodiments, instruction data 120 may request a modification of a value corresponding to exception mode indication 122 (e.g., a data value stored at storage device 110). In some embodiments, the request for modification may correspond to an opcode included in instruction data 120. In various embodiments, at least one of instruction data 120, exception mode indication 122 or exception information 126 may further indicate a specified numerical range. Arithmetic circuit 100 may output values according to a particular format, such as the IEEE STD 754-2008 Floating-Point Arithmetic format.

$$(-1)^{sign} * 2^{(exponent-127)} * 1.mantissa$$

For example, arithmetic circuit 100 may include thirty-two output lines, where one indicates a sign, eight indicate an exponent value, and twenty-three indicate a mantissa value. In the example, arithmetic circuit 100 may output values between $-2^{127}$ and $+2^{128}$. Exception information 126 may indicate this range. However, instruction data 120 may specify a range of $-2^{27}$ to $+2^{32}$ or −4.0 to +4.0. In other embodiments, arithmetic circuit 100 has different numbers of output lines or different amounts of output lines corresponding to the exponent value and the mantissa value. Additionally, in some cases, two's complement or sign magnitude exponent coding may be used. Also, in some cases, bases other than 2 may be used.

In response to determining that arithmetic circuit 100 is in the exception override mode, range exception detection circuit 112 may identify, based on exception information 126, instruction data 120, or both, that arithmetic result 124 corresponds to an overflow exception condition. In other embodiments, range exception detection circuit 112 may identify, based on exception information 126, instruction data, or both, that the For example, range exception detection circuit 112 may include a plurality of comparators configured to compare information received from at least one of exception information 126 or instruction data 120 to information indicating various exception conditions. In response to failing to detect an exception condition, range exception detection circuit 112 may indicate, via selection signal(s) 130, that arithmetic result 124 should be output (e.g., by indicating a value that corresponds to arithmetic result 124 or by specifying arithmetic result 124). In response to detecting an exception condition, range exception detection circuit 112 may indicate one or more corresponding values that are within the specified numerical range. For example, in the illustrated embodiment, in response to instruction data 120, exception information 126, or both, indicating a multiplication operation resulting in a value that is not within the specified numerical range (i.e., a positive value larger than a largest value within the specified numerical range or a negative value smaller than a smallest value within the specified numerical range), exception detection circuit 112 may output selection signal(s) 130 indicating an exponent output and a mantissa output of the largest arithmetic value within the specified numerical range. In the illustrated embodiment, selection signal(s) 130 may indicate a location within storage device 110 where the corresponding values may be located. However, in other embodiments, the corresponding values may be included within selection signal(s) 130 or the corresponding values may be derived based on selection signal(s) 130. Various corresponding values are described below with reference to FIG. 3. In some embodiments, where the specified numerical range is asymmetrical about zero, the exponent output and the mantissa output may correspond to a largest arithmetic value within the specified numerical range for the sign value of arithmetic result 124.

In the illustrated embodiment, instruction data 120 provided to range exception detection circuit 112 is the same data provided to value calculation circuit 102. However, in other embodiments, range exception detection circuit 112 may receive a subset of the data provided to value calculation circuit 102 (e.g., an indication of an instruction, but not the operands), a superset of the data provided to value calculation circuit 102, or at least some different data from the data provided to value calculation circuit 102. In some embodiments, various portions of range exception detection circuit 112 may be part of value calculation circuit 102 (e.g., exception information 126 may indicate an exception condition to range exception detection circuit 112).

Storage device 110 may store various values used by arithmetic circuit 100. In particular, in the illustrated embodiment, storage device 110 stores values corresponding to various exception conditions and provides the values to output circuit 114 as specified value(s) 128. For example, as further discussed below with reference to FIG. 3, storage device 110 may store a value of "0" in a storage location corresponding to a mantissa output for a denormal exception. Additionally in some embodiments, storage device 110 may store a value that indicates whether arithmetic circuit 100 is in the exception mode. Accordingly, exception mode indication 122 may be received at range exception detection circuit 112 from storage device 110. In some embodiments, storage device 110 may include several storage devices. Additionally, in some embodiments, storage device 110 may not be located within arithmetic circuit 100. Further, in some embodiments, storage device 110 may store data associated with devices other than arithmetic circuit 100.

Output circuit 114 may output arithmetic output 132 based on arithmetic result 124, specified value(s) 128, and selection signal(s). In the illustrated embodiment, output circuit 114 is a collection of multiplexers configured to output either corresponding portions of arithmetic result 124 or specified value(s) 128 based on selection signal(s) 130. For example, selection signal(s) 130 may indicate specified value(s) 128 be used for an exponent portion and a mantissa portion of arithmetic output 132 but a sign portion of arithmetic result 124 be used for a sign portion of arithmetic output 132. In some embodiments, rather than receive specified values from range exception detection circuit 112 or storage device 110, output circuit 114 may include logical circuitry that generates various specified values. For example, output circuit 114 may perform a logical AND on a sign portion of arithmetic result 124 and a sign portion of selection signal(s) 130 to generate a sign portion of arithmetic output 132.

Accordingly, arithmetic circuit 100 may detect various exception conditions in arithmetic result 124 and override arithmetic result 124 or portions of arithmetic result 124 with specified values that are within a specified range. Accordingly, arithmetic output 132 may not output a value that is not within the specified range (e.g., equal to or less than the largest number in the specified range and equal to or greater than the smallest number in the specified range). Additionally, arithmetic output 132 may not output a value that indicates the detected exception condition(s). As a result, a device that includes arithmetic circuit 100 may perform the requested arithmetic operation and a clamp operation in response to a single floating-point instruction. Further, the device may not need to address the detected exception conditions at a later time (e.g., by treating the exception as a general purpose exception), which may, in some cases, save processing time, energy, or both.

Figure 2:
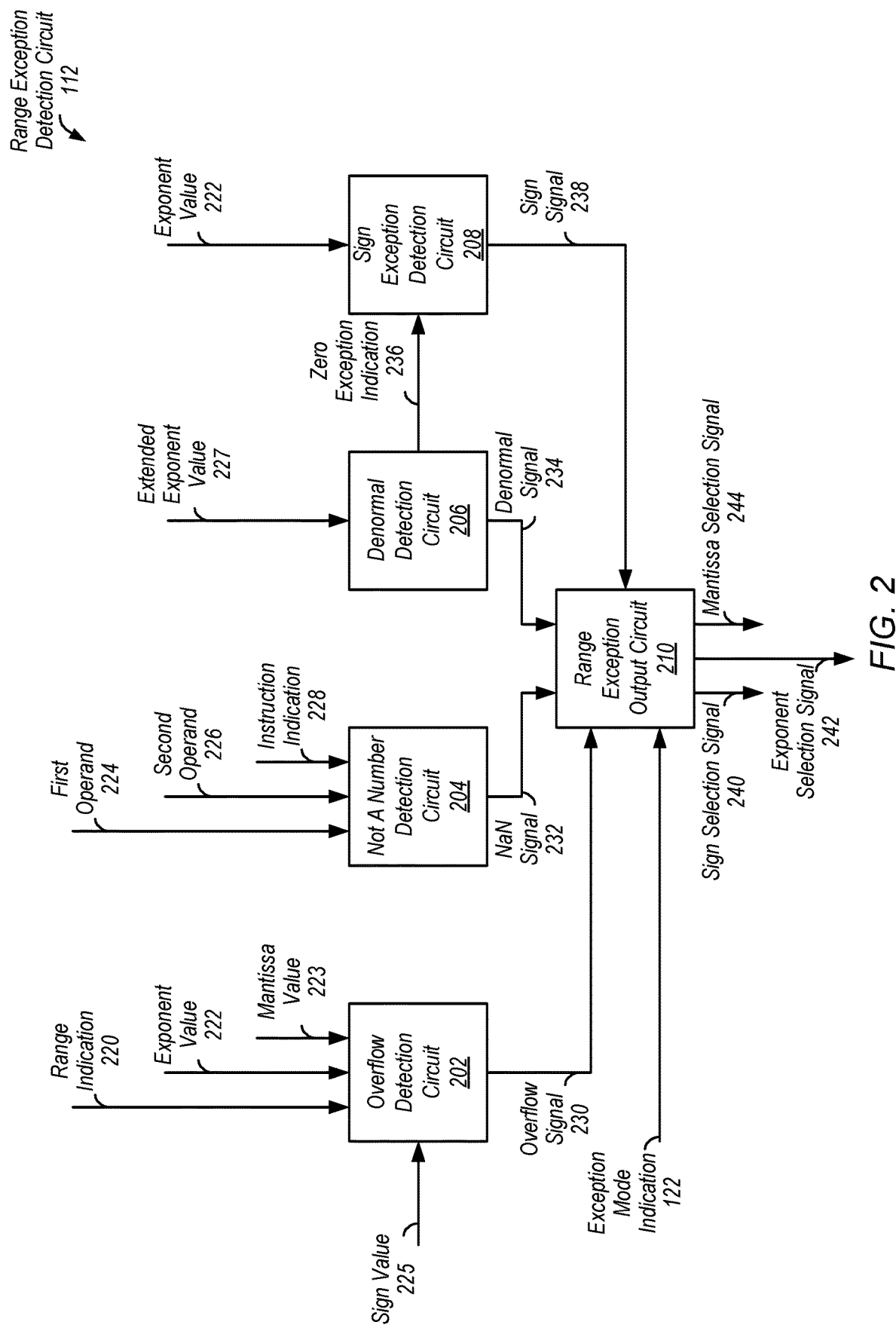
FIG. 2 is a block diagram illustrating one embodiment of an exemplary range exception detection circuit.

Turning now to FIG. 2, a simplified block diagram illustrating one embodiment of range exception detection circuit 112 is shown. In the illustrated embodiment, range exception detection circuit 112 includes overflow detection circuit 202, not a number detection circuit 204, denormal detection circuit 206, sign exception detection circuit 208, and range exception output circuit 210. In various embodiments, circuits configured to detect other exception circuits may also be included. Additionally, in some cases, range exception detection circuit 112 may be configured to detect fewer exception conditions, such as only overflow exceptions. In some cases, various illustrated circuits may be combined or may be located in various other circuits (e.g., value calculation circuit 102 of FIG. 1). In the illustrated embodiment, the illustrated inputs may be portions of one or more of instruction data 120 or exception information 126. Various specific examples of sources of the inputs are described below, but such examples are provided for illustrative purposes only and are not intended to be exhaustive or limiting. In the illustrated embodiment, sign selection signal 240, exponent selection signal 242, and mantissa selection signal 244 may correspond to selection signal(s) 130 of FIG. 1.

Overflow detection circuit 202 may include various comparators configured to detect whether arithmetic result 124 corresponds to an overflow exception. For example, overflow detection circuit 202 may receive range indication 220 as part of the specified range and exponent value 222 from exception information 126. Overflow detection circuit 202 may compare one or more of exponent value 222 or mantissa value 223 to range indication 220 and determine whether exponent value 222 indicates that arithmetic result 124 is within the specified range. In embodiments where a positive portion of the specified range differs from a negative portion of the specified range (e.g., −2048 to +4095 or −1.0 to +3.0), overflow detection circuit 202 may additionally receive sign value 225, an indication of a sign of arithmetic result 124 and compare exponent value 222 to a portion of range indication 220 corresponding to the sign of arithmetic result 124. In the illustrated embodiment, exponent value 222 may indicate an infinite value (e.g., a maximum value of exponent value 222 may indicate an infinite value). However, in other embodiments, overflow detection circuit 202 may detect an overflow based on receiving an indication of an infinite value (e.g., a flag that indicates an infinite value). In response to detecting an overflow (e.g., a value outside of the specified range, including an infinite value), overflow detection circuit 202 may indicate an overflow to range exception output circuit 210 via overflow signal 230.

Not a number detection circuit 204 may include various comparators configured to detect whether arithmetic result 124 corresponds to a not a number exception. For example, not a number detection circuit 204 may receive first operand 224, second operand 226, and instruction indication 228 as part of instruction data 120. Not a number detection circuit 204 may compare first operand 224, second operand 226, and instruction indication 228 to various values (e.g., a representation of infinity, negative infinity, zero, and negative zero) to determine whether a not a number should be a result of the instruction indicated by instruction indication 228. For example, not a number detection circuit 204 may identify a not a number result by detecting infinity divided by infinity, infinity subtracted from infinity, or zero multiplied by infinity. In some embodiments, not a number detection circuit 204 may additionally receive a portion of exception information 126 that indicates a not a number result (e.g., an imaginary number result). In response to detecting a not a number result, not a number detection circuit 204 may indicate a not a number exception to range exception output circuit 210 via NaN signal 232.

Denormal detection circuit 206 may include various comparators configured to detect whether arithmetic result 124 corresponds to a denormal (or subnormal) exception. For example, denormal detection circuit 206 may receive may receive extended exponent value 227. Extended exponent value 227 may be at least a portion of an extended version of exponent value 222. Denormal detection circuit 206 may determine whether extended exponent value 227 indicates a value too small to represent in arithmetic output 132 of FIG. 1. In response to detecting a denormal result, denormal detection circuit 206 may indicate a denormal exception to range exception output circuit 210 via denormal signal 234. Additionally, as discussed below with reference to FIG. 3, in the illustrated embodiment, arithmetic results indicating a denormal exception are overridden with a zero value. Accordingly, denormal detection circuit 206 may also send zero exception indication 236 to sign exception detection circuit 208, indicating that a denormal exception has been detected. In other embodiments, zero exception indication 236 may be sent to sign exception detection circuit 208 from other sources (e.g., range exception output circuit 210).

Sign exception detection circuit 208 may include various comparators configured to detect whether arithmetic result 124 corresponds to a sign exception condition (e.g., a result where a sign of arithmetic result 124 should be overridden, such as a negative zero exception). For example, denormal detection circuit 206 may receive exponent value 222 and compare exponent value 222 to zero. Additionally, as discussed above, various exceptions may have specified values of zero. Sign exception detection circuit 208 may receive an indication that the value will be set to zero. In response to detecting a value of zero, sign exception detection circuit 208 may specify, via sign signal 238, that the sign should be positive. Additionally, more generally, sign exception detection circuit 208 may indicate whether a result of arithmetic result 124 should be overridden and may indicate a value for arithmetic output 132.

In response to exception mode indication 122 indicating an override mode, range exception output circuit 210 may indicate, via sign selection signal 240, exponent selection signal 242, and mantissa selection signal 244, output values for arithmetic circuit 100. In response to overflow signal 230, NaN signal 232, denormal signal 234, and sign signal 238 indicating no exception conditions have been detected, range exception output circuit 210 may indicate that arithmetic result 124 should be output. In response to exception conditions being detected, as further discussed below with reference to FIG. 3, range exception output circuit 210 may specify various specified values to be output. In other embodiments, range exception output circuit 210 may indicate storage locations corresponding to corresponding exception conditions.

Turning now to FIG. 3, a table 300 illustrating specified values corresponding to various exception conditions. As noted previously, in other embodiments, range exception detection circuit 112 may not be configured to detect various exception conditions described herein or may detect additional exception conditions. Additionally, in some embodiments, various specified values may differ. For example, in some embodiments, not a number may have an output value of zero. The specified values described herein may be calculated based on selection signal(s) 130, may be specified by selection signal(s), or may be retrieved from storage device 110.

As illustrated by table 300, when an overflow exception condition (e.g., a value outside the specified range or an infinite value) is detected, a largest value in the specified range may be output as an exponent value and a mantissa value. In some embodiments, the largest value in the specified range for the exponent value and the mantissa value may correspond to the sign. A same sign as the sign of the arithmetic result may be output. When a not a number exception condition is detected, a largest value in the specified range may be output as an exponent value and a mantissa value. A same sign as the sign of the arithmetic result may be output. When a denormal exception condition is detected, a positive sign, an exponent of a most negative exponent (e.g., corresponding to an exponent value of zero), and a mantissa of zero (e.g., a value of positive zero) may be output as the arithmetic output. When a negative zero exception condition is detected, a positive sign, a most negative exponent, and a mantissa of zero (e.g., a value of positive zero) may be output as the arithmetic output.

Figure 4:
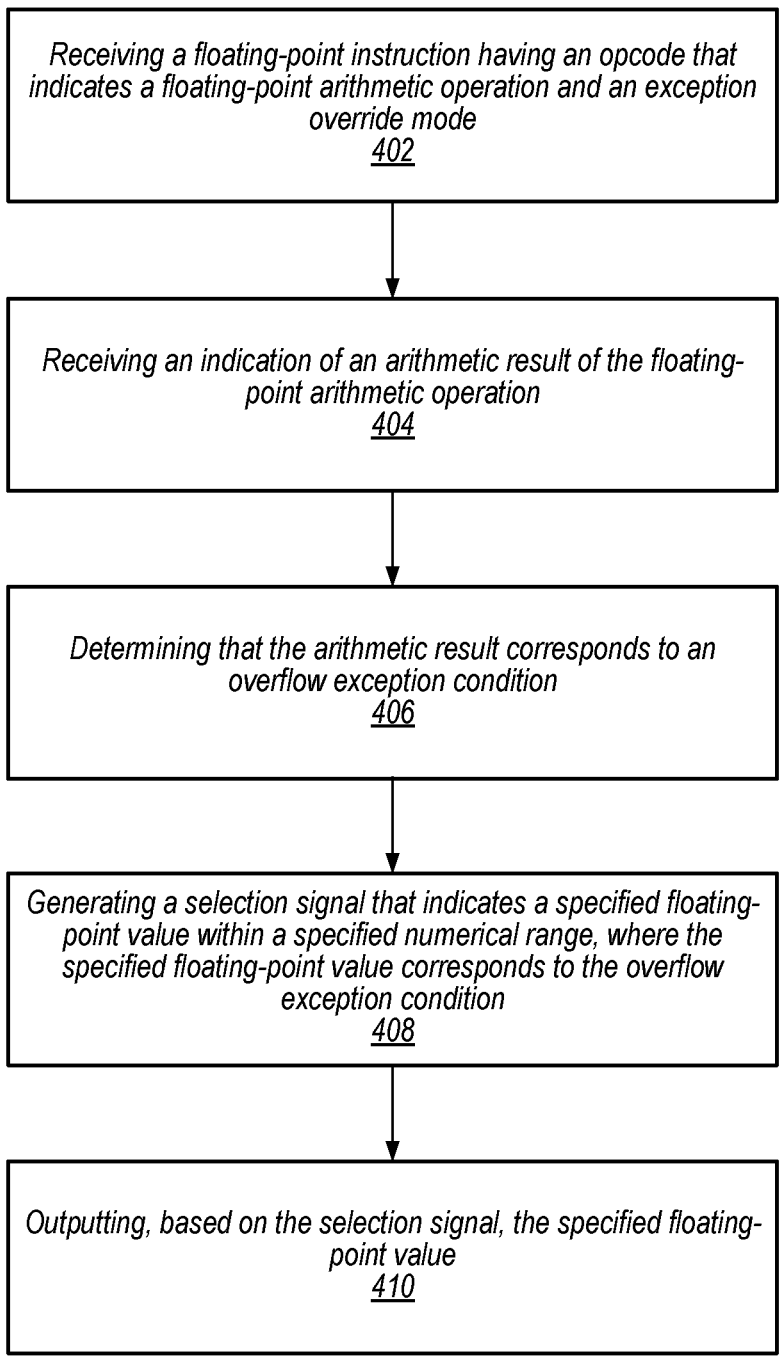
FIG. 4 is a flow diagram illustrating one embodiment of a method of overriding a floating-point arithmetic operation range exception.

Referring now to FIG. 4, a flow diagram of a method 400 of overriding a floating-point arithmetic operation range exception is depicted. In some embodiments, method 400 may be initiated or performed by one or more processors in response to one or more instructions stored by a computer-readable storage medium.

At 402, method 400 includes receiving a floating-point instruction having an opcode that indicates a floating-point arithmetic operation and an exception override mode. For example, range exception detection circuit 112 of FIG. 1 may receive instruction data 120 that indicates a floating-point arithmetic operation and includes exception mode indication 122, indicating an exception override mode.

At 404, method 400 includes receiving an indication of an arithmetic result of the floating-point arithmetic operation. For example, range exception detection circuit 112 may receive exception information 126, instruction data 120, or both, indicating features of arithmetic result 124, such as at least one of range indication 220 of FIG. 2, exponent value 222, mantissa value 223, or sign value 225.

At 406, method 400 includes determining that the arithmetic result corresponds to an overflow exception condition. For example, range exception detection circuit 112 may determine, based on exception information 126, instruction data 120, or both, that arithmetic result 124 corresponds to an overflow exception condition. Additionally, as discussed above, in some embodiments, range exception detection circuit 112 may detect one or more other exception conditions.

At 408, method 400 includes generating a selection signal that indicates a specified floating-point value within a specified numerical range, where the specified floating-point value corresponds to the overflow exception condition. For example, range exception detection circuit 112 may generate selection signal(s) 130 that indicates a largest positive value within the specified range or a smallest negative value within the specified range (e.g., by indicating inputs from storage device 110 that provide corresponding values).

At 410, method 400 includes outputting, based on the selection signal, the specified floating-point value. For example, based on selection signal(s) 130, output circuit 114 may output various specified value(s) 128 that correspond to the detected exception condition. Accordingly, a method of overriding a floating-point arithmetic operation range exception is depicted.

Figure 5:
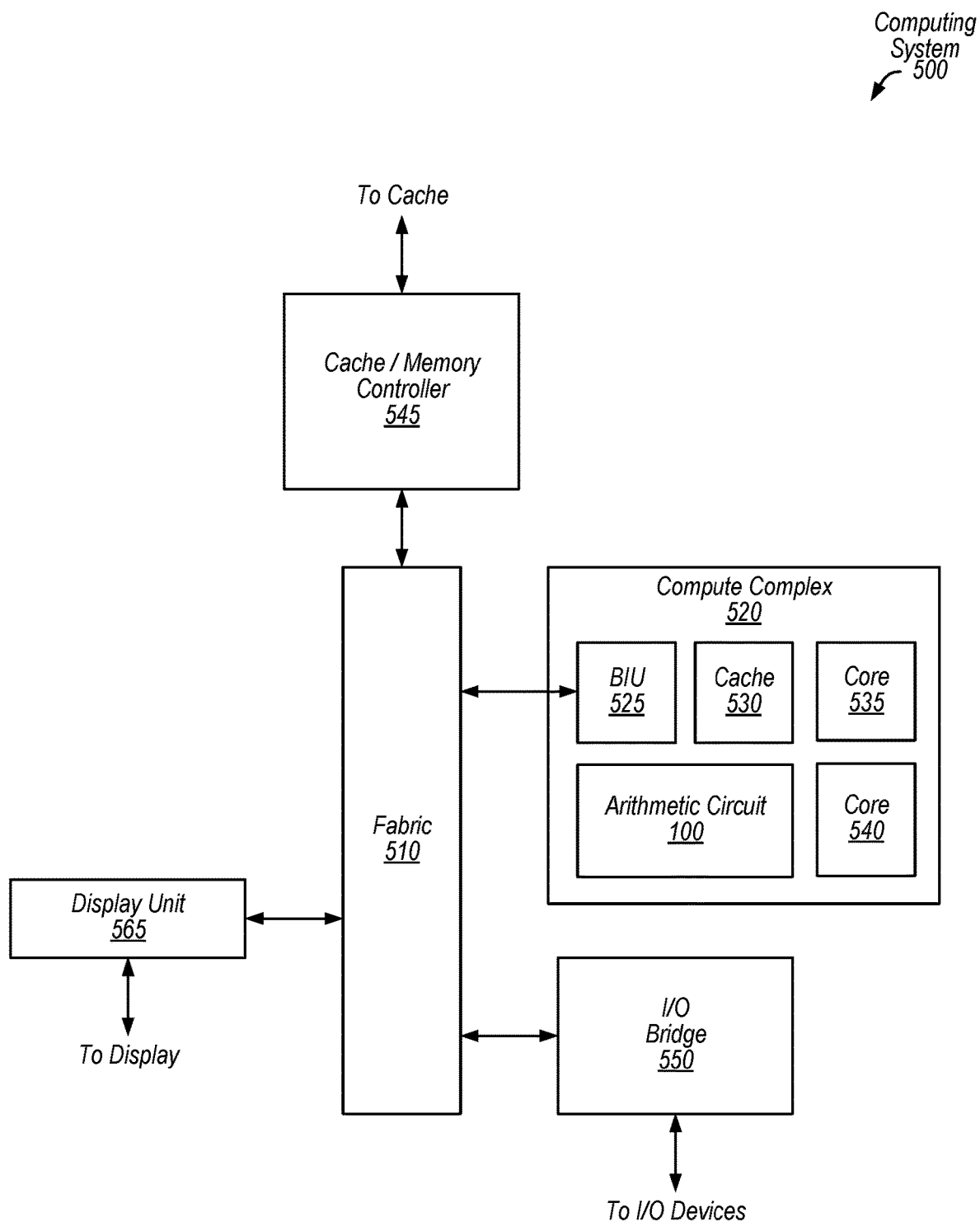
FIG. 5 is block diagram illustrating an embodiment of a computing system that includes at least a portion of a floating-point arithmetic operation range exception override circuit.

Turning next to FIG. 5, a block diagram illustrating an exemplary embodiment of a computing system 500 that includes at least a portion of a floating-point arithmetic operation range exception override circuit. The computing system 500 includes arithmetic circuit 100 of FIG. 1. In some embodiments, arithmetic circuit 100 includes one or more of the circuits described above with reference to FIG. 1, including any variations or modifications described previously with reference to FIGS. 1-4. In some embodiments, some or all elements of the computing system 500 may be included within a system on a chip (SoC). In some embodiments, computing system 500 is included in a mobile device. Accordingly, in at least some embodiments, area and power consumption of the computing system 500 may be important design considerations. In the illustrated embodiment, the computing system 500 includes fabric 510, compute complex 520, input/output (I/O) bridge 550, cache/memory controller 545, and display unit 565. Although the computing system 500 illustrates arithmetic circuit 100 as being located within compute complex 520, in other embodiments, computing system 500 may include arithmetic circuit 100 in other locations (e.g., connected to or included in cache/memory controller 545) or may include multiple instances of arithmetic circuit 100. The arithmetic circuits 100 may correspond to different embodiments or to the same embodiment.

Fabric 510 may include various interconnects, buses, MUXes, controllers, etc., and may be configured to facilitate communication between various elements of computing system 500. In some embodiments, portions of fabric 510 are configured to implement various different communication protocols. In other embodiments, fabric 510 implements a single communication protocol and elements coupled to fabric 510 may convert from the single communication protocol to other communication protocols internally.

In the illustrated embodiment, compute complex 520 includes bus interface unit (BIU) 525, cache 530, cores 535 and 540, and arithmetic circuit 100. In some embodiments, cache 530, cores 535 and 540, other portions of compute complex 520, or a combination thereof may be hardware resources. In various embodiments, compute complex 520 includes various numbers of cores and/or caches. For example, compute complex 520 may include 1, 2, or 4 processor cores, or any other suitable number. In some embodiments, cores 535 and/or 540 include internal instruction and/or data caches. In some embodiments, a coherency unit (not shown) in fabric 510, cache 530, or elsewhere in computing system 500 is configured to maintain coherency between various caches of computing system 500. BIU 525 may be configured to manage communication between compute complex 520 and other elements of computing system 500. Processor cores such as cores 535 and 540 may be configured to execute instructions of a particular instruction set architecture (ISA), which may include operating system instructions and user application instructions.

Cache/memory controller 545 may be configured to manage transfer of data between fabric 510 and one or more caches and/or memories (e.g., non-transitory computer readable mediums). For example, cache/memory controller 545 may be coupled to an L3 cache, which may, in turn, be coupled to a system memory. In other embodiments, cache/ memory controller 545 is directly coupled to a memory. In some embodiments, the cache/memory controller 545 includes one or more internal caches. In some embodiments, the cache/memory controller 545 may include or be coupled to one or more caches and/or memories that include instructions that, when executed by one or more processors (e.g., compute complex 520), cause the processor, processors, or cores to initiate or perform some or all of the processes described above with reference to FIGS. 1-4 or below with reference to FIG. 6. In some embodiments, one or more portions of the caches/memories may correspond to hardware resources.

As used herein, the term "coupled to" may indicate one or more connections between elements, and a coupling may include intervening elements. For example, in FIG. 5, display unit 565 may be described as "coupled to" compute complex 520 through fabric 510. In contrast, in the illustrated embodiment of FIG. 5, display unit 565 is "directly coupled" to fabric 510 because there are no intervening elements.

Display unit 565 may be configured to read data from a frame buffer and provide a stream of pixel values for display. Display unit 565 may be configured as a display pipeline in some embodiments. Additionally, display unit 565 may be configured to blend multiple frames to produce an output frame. Further, display unit 565 may include one or more interfaces (e.g., MIPI® or embedded display port (eDP)) for coupling to a user display (e.g., a touchscreen or an external display). In some embodiments, one or more portions of display unit 565 may be hardware resources.

I/O bridge 550 may include various elements configured to implement: universal serial bus (USB) communications, security, audio, and/or low-power always-on functionality, for example. I/O bridge 550 may also include interfaces such as pulse-width modulation (PWM), general-purpose input/output (GPIO), serial peripheral interface (SPI), and/or inter-integrated circuit (I2C), for example. Various types of peripherals and devices may be coupled to computing system 500 via I/O bridge 550. In some embodiments, arithmetic circuit 100 may be coupled to computing system 500 via I/O bridge 550. In some embodiments, one or more devices coupled to I/O bridge 550 may be hardware resources.

Figure 6:
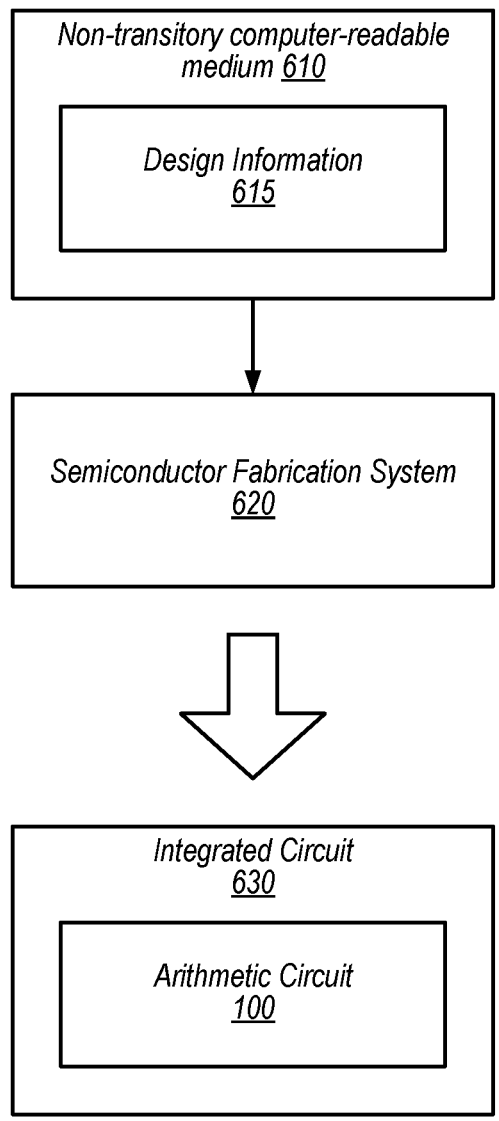
FIG. 6 is a block diagram illustrating one embodiment of a process of fabricating at least a portion of a processing circuit that includes a floating-point arithmetic operation range exception override circuit.

FIG. 6 is a block diagram illustrating a process of fabricating at least a portion of a floating-point arithmetic operation range exception override circuit. FIG. 6 includes a non-transitory computer-readable medium 610 and a semiconductor fabrication system 620. Non-transitory computer-readable medium 610 includes design information 615. FIG. 6 also illustrates a resulting fabricated integrated circuit 630. In the illustrated embodiment, integrated circuit 630 includes arithmetic circuit 100 of FIG. 1. However, in other embodiments, integrated circuit 630 may only include one or more portions of arithmetic circuit 100 (e.g., output circuit 114). In some embodiments, integrated circuit 630 may include different embodiments of arithmetic circuit 100 (e.g., embodiments that don't include storage device 110). In the illustrated embodiment, semiconductor fabrication system 620 is configured to process design information 615 stored on non-transitory computer-readable medium 610 and fabricate integrated circuit 630.

Non-transitory computer-readable medium 610 may include any of various appropriate types of memory devices or storage devices. For example, non-transitory computer-readable medium 610 may include at least one of an installation medium (e.g., a CD-ROM, floppy disks, or tape device), a computer system memory or random access memory (e.g., DRAM, DDR RAM, SRAM, EDO RAM, Rambus RAM, etc.), a non-volatile memory such as a Flash, magnetic media (e.g., a hard drive, or optical storage), registers, or other types of non-transitory memory. Non-transitory computer-readable medium 610 may include two or more memory mediums, which may reside in different locations (e.g., in different computer systems that are connected over a network).

Design information 615 may be specified using any of various appropriate computer languages, including hardware description languages such as, without limitation: VHDL, Verilog, SystemC, SystemVerilog, RHDL, M, MyHDL, etc. Design information 615 may be usable by semiconductor fabrication system 620 to fabricate at least a portion of integrated circuit 630. The format of design information 615 may be recognized by at least one semiconductor fabrication system 620. In some embodiments, design information 615 may also include one or more cell libraries, which specify the synthesis and/or layout of integrated circuit 630. In some embodiments, the design information is specified in whole or in part in the form of a netlist that specifies cell library elements and their connectivity. Design information 615, taken alone, may or may not include sufficient information for fabrication of a corresponding integrated circuit (e.g., integrated circuit 630). For example, design information 615 may specify circuit elements to be fabricated but not their physical layout. In this case, design information 615 may be combined with layout information to fabricate the specified integrated circuit.

Semiconductor fabrication system 620 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 620 may also be configured to perform various testing of fabricated circuits for correct operation.

In various embodiments, integrated circuit 630 is configured to operate according to a circuit design specified by design information 615, which may include performing any of the functionality described herein. For example, integrated circuit 630 may include any of various elements described with reference to FIGS. 1-5. Further, integrated circuit 630 may be configured to perform various functions described herein in conjunction with other components. The functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

In some embodiments, a method of initiating fabrication of integrated circuit 630 is performed. Design information 615 may be generated using one or more computer systems and stored in non-transitory computer-readable medium 610. The method may conclude when design information 615 is sent to semiconductor fabrication system 620 or prior to design information 615 being sent to semiconductor fabrication system 620. Accordingly, in some embodiments, the method may not include actions performed by semiconductor fabrication system 620. Design information 615 may be sent to semiconductor fabrication system 620 in a variety of ways. For example, design information 615 may be transmitted (e.g., via a transmission medium such as the Internet) from non-transitory computer-readable medium 610 to semiconductor fabrication system 620 (e.g., directly or indirectly). As another example, non-transitory computer-readable medium 610 may be sent to semiconductor fabrication system 620. In response to the method of initiating fabrication, semiconductor fabrication system 620 may fabricate integrated circuit 630 as discussed above.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
    an arithmetic circuit configured to perform a floating-point arithmetic operation, wherein the arithmetic circuit includes:
        a range exception detection circuit configured to generate a selection signal that indicates whether a floating-point arithmetic result generated within the arithmetic circuit corresponds to an overflow exception condition; and
        an output circuit configured to:
            in response to the selection signal indicating the floating-point arithmetic result is within a specified numerical range, output the floating-point arithmetic result; and
            in response to the selection signal indicating that the floating-point arithmetic result corresponds to the overflow exception condition:
                retrieve, from a particular storage location indicated by the selection signal, a specified floating-point value that is within the specified numerical range; and
                output the specified floating-point value that is within the specified numerical range, wherein the specified floating-point value corresponds to the overflow exception condition.

2. The apparatus of claim 1, wherein a mantissa and an exponent of the specified floating-point value correspond to a largest value within the specified numerical range.

3. The apparatus of claim 1, wherein the range exception detection circuit is further configured to generate a selection signal that indicates that the floating-point arithmetic result corresponds to a different overflow exception condition, wherein the different overflow exception condition corresponds to an arithmetic result having a negative sign, and wherein the overflow exception condition corresponds to an arithmetic result having a positive sign.

4. The apparatus of claim 3, wherein the output circuit is configured in response to the selection signal indicating the different overflow exception condition, to output a different specified floating-point value.

5. The apparatus of claim 4, wherein the different specified floating-point value is a smallest negative number within the specified numerical range.

6. The apparatus of claim 1, wherein the arithmetic circuit is configured to identify the specified numerical range based on an indication of the specified numerical range in a received instruction.

7. The apparatus of claim 6, wherein the arithmetic circuit is further configured to identify the floating-point arithmetic operation from the received instruction.

8. The apparatus of claim 1, wherein the arithmetic circuit is configured to identify the specified numerical range based on an indication of the specified numerical range stored in a particular storage location.

9. The apparatus of claim 1, wherein the output circuit comprises a plurality of storage locations configured to store respective floating-point values, and wherein the plurality of storage locations include the particular storage location.

10. The apparatus of claim 1, wherein the range exception detection circuit is further configured to generate selection signals corresponding to respective exception conditions of a plurality of exception conditions, wherein the plurality of exception conditions include the overflow exception condition and at least one of a denormal exception, a not a number exception, or a negative zero exception.

11. The apparatus of claim 10, wherein the output circuit is further configured to, in response to the selection signal indicating that the floating-point arithmetic result corresponds to a particular exception condition of the plurality of exception conditions, output a specified floating-point value that is within the specified numerical range, wherein the specified floating-point value corresponds to the particular exception condition.

12. A method, comprising:
    receiving, by an arithmetic circuit, a floating-point instruction having an opcode that indicates a floating-point arithmetic operation and an exception override mode;
    receiving, by a range exception detection circuit of the arithmetic circuit, an indication from the arithmetic circuit of an arithmetic result of the floating-point arithmetic operation;
    determining, by the range exception detection circuit, that the arithmetic result corresponds to an overflow exception condition;
    generating, by the range exception detection circuit, a selection signal that indicates a specified floating-point value within a specified numerical range, wherein the specified floating-point value corresponds to the overflow exception condition, and wherein the floating-point instruction indicates the specified numerical range; and
    outputting, by an output circuit of the arithmetic circuit based on the selection signal, the specified floating-point value.

13. The method of claim 12, wherein the arithmetic circuit is part of an audio processing circuit, and wherein the floating-point instruction is an audio processing instruction.

14. The method of claim 12, wherein outputting the specified floating-point value comprises retrieving the specified floating-point value from a storage location indicated by the selection signal.

15. A non-transitory computer readable storage medium having stored thereon design information that specifies a circuit design in a format recognized by a fabrication system that is configured to use the design information to fabricate a hardware integrated circuit that includes:
- an arithmetic circuit configured to perform a floating-point arithmetic operation, wherein the arithmetic circuit includes:
  - a mode register configured to store a value that indicates whether the arithmetic circuit is in an exception override mode;
  - a range exception detection circuit configured, in response to the value indicating the arithmetic circuit is in the exception override mode, to generate a selection signal that indicates whether a floating-point arithmetic result of the floating-point arithmetic operation generated within the arithmetic circuit corresponds to an overflow exception condition; and
- an output circuit configured to:
  - in response to the selection signal indicating the floating-point arithmetic result is within a specified numerical range, output the floating-point arithmetic result; and
  - in response to the selection signal indicating that the floating-point arithmetic result corresponds to the overflow exception condition:
    - retrieve, from a particular storage location indicated by the selection signal, a specified floating-point value that is within the specified numerical range; and
    - output the specified floating-point value that is within the specified numerical range, wherein the specified floating-point value corresponds to the overflow exception condition.

16. The non-transitory computer readable storage medium of claim 15, wherein the particular storage location corresponds to the mode register.

17. The non-transitory computer readable storage medium of claim 15, wherein the arithmetic circuit is configured to modify the value that indicates whether the arithmetic circuit is in the exception override mode in response to receiving an instruction having an opcode that indicates the exception override mode.

* * * * *